(12) United States Patent
Syre et al.

(10) Patent No.: US 11,846,399 B2
(45) Date of Patent: Dec. 19, 2023

(54) LIGHTING DEVICE COMPRISING A MOVABLE SIGNALING MODULE AND A MOVABLE LIGHTING MODULE

(71) Applicant: VALEO VISION, Bobigny (FR)

(72) Inventors: Matthieu Syre, Bobigny (FR); Stephane Patrizi, Bobigny (FR); Olivier Ruat, Bobigny (FR); Samuel Trottier, Bobigny (FR); Philippe Lopez, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/762,203

(22) PCT Filed: Sep. 21, 2020

(86) PCT No.: PCT/EP2020/076230
§ 371 (c)(1),
(2) Date: Oct. 17, 2022

(87) PCT Pub. No.: WO2021/063714
PCT Pub. Date: Apr. 8, 2021

(65) Prior Publication Data
US 2023/0025545 A1 Jan. 26, 2023

(30) Foreign Application Priority Data

Sep. 30, 2019 (FR) ...................................... 1910807

(51) Int. Cl.
*F21S 43/19* (2018.01)
*F21S 41/657* (2018.01)

(52) U.S. Cl.
CPC ............ *F21S 41/657* (2018.01); *F21S 43/19* (2018.01)

(58) Field of Classification Search
CPC ................................ F21S 41/657; F21S 43/19
See application file for complete search history.

(56) References Cited

U.S. PATENT DOCUMENTS

2017/0174121 A1\* 6/2017 Wasilewski ............. B60Q 1/04

FOREIGN PATENT DOCUMENTS

DE     102009030564 A1    12/2010
DE     102011051152 A1    12/2012
(Continued)

OTHER PUBLICATIONS

European Patent Office, International Search Report and Written Opinion of corresponding International Application No. PCT/EP2020/076230, dated Nov. 26, 2020.

*Primary Examiner* — Anne M Hines
(74) *Attorney, Agent, or Firm* — Valeo Vision

(57) ABSTRACT

The invention includes a lighting device with a signaling module that can move in at least a first direction and a lighting module that can move in a second direction different from the first direction. The movable lighting module being able to take a position that is invisible and a position that is visible from outside the lighting device. The lighting device further including a controller designed to control a movement of the lighting module such that: in a first mode, called daytime mode, the lighting module assumes the invisible position; in a second mode, called nighttime mode, the lighting module assumes the visible position. The controller moves of the signaling module such that at least one part of the signaling module moves in the first direction in order to authorize a movement of the lighting module in the second direction from the invisible position to the visible position.

11 Claims, 4 Drawing Sheets

(56) References Cited

FOREIGN PATENT DOCUMENTS

DE     102016124111 A1    6/2017
KR         101361090 B1    2/2014
KR         20150127385 A   11/2015

\* cited by examiner

LIGHTING DEVICE COMPRISING A MOVABLE SIGNALING MODULE AND A MOVABLE LIGHTING MODULE

CROSS-REFERENCE TO RELATED APPLICATIONS

This application is filed under 35 U.S.C. § 371 U.S. National Phase of International Application No. PCT/EP2020/076230 filed Sep. 21, 2020 (published as WO2021063714), which claims priority benefit to French application No. 1910807 filed on Sep. 30, 2019, the disclosures of which are herein incorporated by reference in their entirety.

TECHNICAL FIELD

The invention relates to the field of motor-vehicle lighting devices. More precisely, the invention relates to the field of the luminous appearance of a motor-vehicle lighting device under daytime and nighttime conditions.

BACKGROUND OF THE INVENTION

The lighting devices of motor vehicles, and in particular the front headlamps, contribute greatly to the esthetic appearance of these vehicles. In particular, automobile manufacturers now style these lighting devices so that their luminous appearance allows them to be differentiated from other manufacturers, by virtue of a luminous signature created by the various lighting and signaling modules when they are turned on.

At odds with this need to generate a luminous signature are regulatory constraints defining not only the perceived brightness of the light beams, no matter whether they are for signaling or lighting purposes, but also the period, i.e. nighttime or daytime, during which these light beams must be emitted. It is thus for example that the DRL signaling function, DRL being the acronym of daytime running light, which must be turned on during the day, is distinguished from the low-beam lighting function, which must be turned on at night. These two functions cannot therefore be activated simultaneously.

BRIEF SUMMARY OF THE INVENTION

Thus, in order to be able to create a luminous signature that remains the same, during the day and at night, a motor-vehicle lighting device has been devised that comprises a moveable signaling module and a fixed lighting module, and in which the signaling module may be activated during a daytime period and may be retracted during a nighttime period in order to reveal the lighting module which, when it is activated, replicates the luminous appearance of the signaling module.

However, this solution is unsatisfactory. Specifically, it has been observed that a significant portion of the light beam emitted by the lighting module when it is activated is obstructed by one portion of the retracted signaling module, this being a problem in terms of regulatory constraints since the light intensity of the light beam produced by the lighting module then does not reach minimums prescribed for certain points in space. Furthermore, it is not possible to retract the signaling module sufficiently to avoid obstruction of the light beam emitted by the lighting module, the available space being constrained by the other parts of the motor vehicle.

There is thus a need for a motor-vehicle lighting device that has a luminous signature that hardly changes at all between daytime and nighttime mode, by virtue of a movement of a signaling module to reveal a lighting module in nighttime mode, and the light beam or beams emitted by the lighting module of which meet the regulatory requirements relating to these beams. The present invention falls within this context and aims to meet this need.

To these ends, one subject of the invention is a motor-vehicle lighting device, including a signaling module that is moveable in at least a first direction and a lighting module that is moveable in a second direction different from the first direction, the moveable lighting module being able to assume a position in which it is invisible and a position in which it is visible from outside the lighting device. The lighting device includes a controller arranged to control a movement of the lighting module so that in a first mode, called the daytime mode, the lighting module assumes the invisible position and in a second mode, called the nighttime mode, the lighting module assumes the visible position.

The invention is characterized in that, during the transition from the first mode to the second mode, the controller is arranged to control a movement of the signaling module so that at least one portion of the signaling module moves in the first direction to permit a movement of the lighting module in the second direction from the invisible position to the visible position.

It will thus be understood that, by virtue of the invention, when the signaling module is retracted to reveal the lighting module, the lighting module itself moves in order to enter the space left available by the signaling module. In this way, the emission zone available to the lighting module when it is in its visible position is much larger than that available when it is in its invisible position. The light beam emitted by the lighting module when it is activated is therefore no longer obstructed by the signaling module, and hence the requirements relating to this beam are met.

By signaling module what is meant is a module comprising at least one optical unit comprising a light source and an optical element, these being arranged to emit a light beam that performs all or some of at least one daytime signaling function, a DRL function for example. Where appropriate, the signaling module will possibly comprise a plurality of optical units each comprising one light source and one optical element, each of the light sources being selectively activatable, the signaling module thus being arranged to generate all or some of a DRL, of a position light, of a standard or sequential direction indicator and/or a welcome lighting scenario. The plurality of optical units may in this case be arranged on a common plate mounted so as to be moveable in the lighting device in the first direction.

By lighting module what is meant is a module comprising at least one optical unit comprising a light source and an optical element, these being arranged to emit a light beam that performs all or some of at least one regulatory lighting function, a low- or high-beam lighting function for example.

Advantageously, the controller may comprise an internal clock so as to determine the, daytime or nighttime, mode that the lighting device must adopt. As a variant, the controller may be arranged to receive, for example from a computer external to the device, information relating to the, daytime or nighttime, mode that the lighting device must adopt.

Advantageously, the signaling and lighting modules may be arranged so that, in the position in which the lighting module is invisible, the lighting module is masked by all or some of the signaling module, for example because it is behind the signaling module. Advantageously again, the signaling and lighting modules may be arranged so that, in the transition to the position in which the lighting module is visible, the signaling module is retracted in the first direction and the lighting module is moved in the second direction into the space left free by the signaling module. For example, the first direction is oriented toward the top of the lighting device, and especially toward the top and rear of the lighting device, and the second direction is oriented toward the front of the lighting device.

In a first embodiment of the invention, the moveable signaling module is able to assume a position in which it is at least partially invisible and a position in which it is visible from outside the lighting device, and the controller may be arranged to control a movement of the signaling module so that in the first mode, the signaling module assumes the visible position and in the second mode, the signaling module assumes the position in which it is at least partially invisible.

For example, in the position in which the signaling module is at least partially invisible, the signaling module may be partially or completely masked by a mask of the lighting device or by a segment of the bodywork of the motor vehicle.

In a second alternative or additional embodiment of the invention, the controller may be arranged to control the turn-on and turn-off of each of the moveable signaling and lighting modules. Where appropriate, in the first mode, the controller is arranged to turn on the signaling module and turn off the lighting module; and in the second mode, the controller is arranged to turn on the lighting module and turn off the signaling module. These two embodiments, whether they are provided together or separately, allow a luminous signature that does not change between daytime mode and nighttime mode to be obtained.

If so desired, the device may comprise a fixed signaling module. For example, the fixed signaling module may be arranged plumb with the moveable signaling module and, where appropriate, the lighting module in its visible position.

In one embodiment of the invention, the moveable signaling module comprises a first signaling sub-module that is moveable in said first direction and a second signaling sub-module that is moveable in a third direction different from the first and second directions. For example, the third direction is substantially symmetric to the first direction. According to one example, the third direction is substantially symmetric to the first direction with respect to an axis defined by the second direction.

Advantageously, the moveable signaling module may assume a closed position in which the first and second signaling sub-modules assume positions in which they are substantially contiguous and an open position in which the first and second signaling sub-modules assume positions in which they are distant from each other. For example, in the open position, the first and second signaling sub-modules are positioned on either side, above and below for example, the lighting module in its visible position. Where appropriate, the controller is arranged to control a movement of the signaling module so that, in the first mode, the signaling module assumes the closed position; and, in the second mode, the signaling module assumes the open position. The closed position may thus define the position in which the signaling module is visible and the open position may thus define the position in which the signaling module is invisible.

In one embodiment of the invention, the lighting device comprises a first actuator for driving a movement of the moveable signaling module and a second actuator for driving a movement of the moveable lighting module. Where appropriate, the controller is arranged to control the first and second actuators so that the movements of the moveable signaling and lighting modules in the first and second directions are synchronous.

In another embodiment of the invention, the lighting device comprises a drive system that mechanically links the moveable signaling and lighting modules, the drive system being arranged so that a movement of one of the moveable signaling and lighting modules in the first direction drives a movement of the other of the modules of the moveable signaling and lighting modules in the first direction, and so that a movement of one of the moveable signaling and lighting modules in the second direction drives a movement of the other of the modules of the moveable signaling and lighting modules in the second direction. Where appropriate, only the movements of one of the moveable signaling and lighting modules is driven directly by means of an actuator, the movement of the other of the modules being driven by the drive system. For example, the drive system will possibly comprise one or more connecting rods linking the signaling and lighting modules to each other.

Advantageously, the moveable signaling module and/or the moveable lighting module comprises a plate mounted so as to be moveable translationally in a fixed slideway. If so desired, the slideway may have an S-shaped profile. For example, the lighting system will possibly comprise two slideways placed on either side of said plate mounted so as to be moveable. In the case of the embodiment in which the signaling module comprises first and second signaling sub-modules, provision will possibly be made for a common guiding part in which at least a first slideway intended to receive a finger of a plate of the first sub-module and a second slideway intended to receive a finger of a plate of the second sub-module are formed. Where appropriate, the first and second slideways may be symmetric.

Another subject of the invention is a method for controlling a lighting device according to the invention.

BRIEF DESCRIPTION OF THE DRAWINGS

The present invention will now be described with reference to examples that are only illustrative and in no way limit the scope of the invention, and with reference to the accompanying illustrations, in which.

DETAILED DESCRIPTION OF THE INVENTION

In the following description, elements that are identical in terms of structure or in terms of function and that appear in various figures have been designated with the same reference, unless otherwise indicated. Furthermore, the terms "front", "rear", "top" and "bottom" must be interpreted in the context of the orientation of the lighting device such as it has been shown, corresponding to normal use of the lighting device, such as for example when mounted in a motor vehicle.

Figure 1:
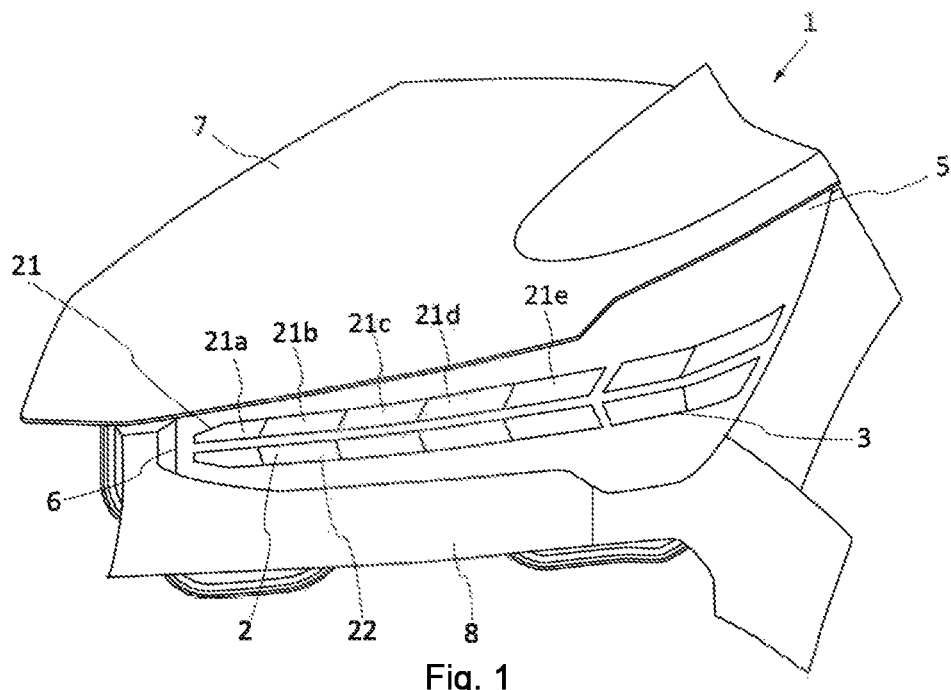
FIG. 1 shows a front view of a lighting device in daytime mode according to one embodiment of the invention.

FIG. 1 shows a front view of a lighting device 1 according to one embodiment of the invention. A cross-sectional side view of the device 1 and a cross-sectional top view of the device 1 have also been shown in FIG. 2 and FIG. 3, respectively. The following description of the device 1 thus makes reference to these three figures FIG. 1, FIG. 2 and FIG. 3.

The lighting device 1 comprises a casing 5 closed by a sealing outer lens 6. The lighting device 1 is a front headlamp, shown in FIG. 1 in daytime mode and installed in a motor vehicle, between the bodywork 7 and the bumper 8, which thus frame the outer lens 6.

The lighting device comprises a moveable signaling module 2, a fixed signaling module 3 and a moveable lighting module 4, all installed in the casing 5. The moveable modules 2 and 4 are mounted so as to be moveable with respect to the casing 5.

The moveable signaling module 2 comprises a first signaling sub-module 21 that is moveable in a direction D1, and a second signaling sub-module 22 that is moveable in a direction D2. The first sub-module 21 is called the upper sub-module whereas the second sub-module 22 is called the lower sub-module, and arranged below the upper sub-module 21. The direction D1 is oriented toward the top and rear of the lighting device, whereas the direction D2 is oriented toward the bottom and rear of the lighting device, symmetrically to the direction D1.

The structures of the upper and lower sub-modules 21, 22 are identical. Thus, only the structure of the upper sub-module 21 will be described. The upper sub-module 21 comprises a plurality of optical units 21a to 21e placed side by side along the width of the lighting device 1. Each of the optical units 21a to 21e comprises a light source S, a reflector R and a screen E. The plurality of optical units 21a to 21e is arranged on a common plate 23 of the upper sub-module 21, which comprises two arms 24 that extend toward the rear of the lighting device 1. Each arm 24 comprises two fingers 25 that are each mounted in a slideway 26 perforated in a guiding part 27. The lighting device 1 thus comprises two guiding parts 27 placed on either side of the moveable signaling module 2. It will be noted that the guiding parts 27 are common to the upper and lower sub-modules 21, 22, and that they each thus comprise four slideways 26, two upper slideways and two lower slideways, each for receiving one of the fingers of the arms of each plate. The slideways are symmetric with respect to a horizontal plane and each have an S-shaped profile that defines the directions of movement D1 and D2 of the upper and lower sub-modules 21, 22. A pair of actuators (not shown) is provided in the lighting device 1 with a view to driving a synchronous movement of the upper and lower sub-modules 21, 22 in the directions D1 and D2, for example via simultaneous application of a force of equal magnitude to each of the arms 24.

The moveable lighting module 4 comprises a first lighting sub-module 41 and a second lighting sub-module 42, which are placed side by side along the width of the lighting device 1. Each of the sub-modules 41, 42 comprises a plurality of light sources that are associated with an optical system, a light guide and lens (not shown) for example. These sub-modules 41, 42 are mounted on a common plate 43, which is mounted so as to be moveable translationally in the casing 5 of the lighting device 1 in a horizontal direction D3, which is oriented toward the front of the lighting device 1. An actuator (not shown) is also provided in the lighting device 1 with a view to driving a movement of the lighting module 4 in the direction D3.

Lastly, the fixed signaling module 3 is permanently fastened in the casing 5, plumb with the moveable signaling module 2, and comprises a light source and a reflector (which have not been shown).

The positions of the various modules 2, 3 and 4 in the daytime mode of the lighting device 1 and the various functions that these modules may perform will now be described.

Figure 2:
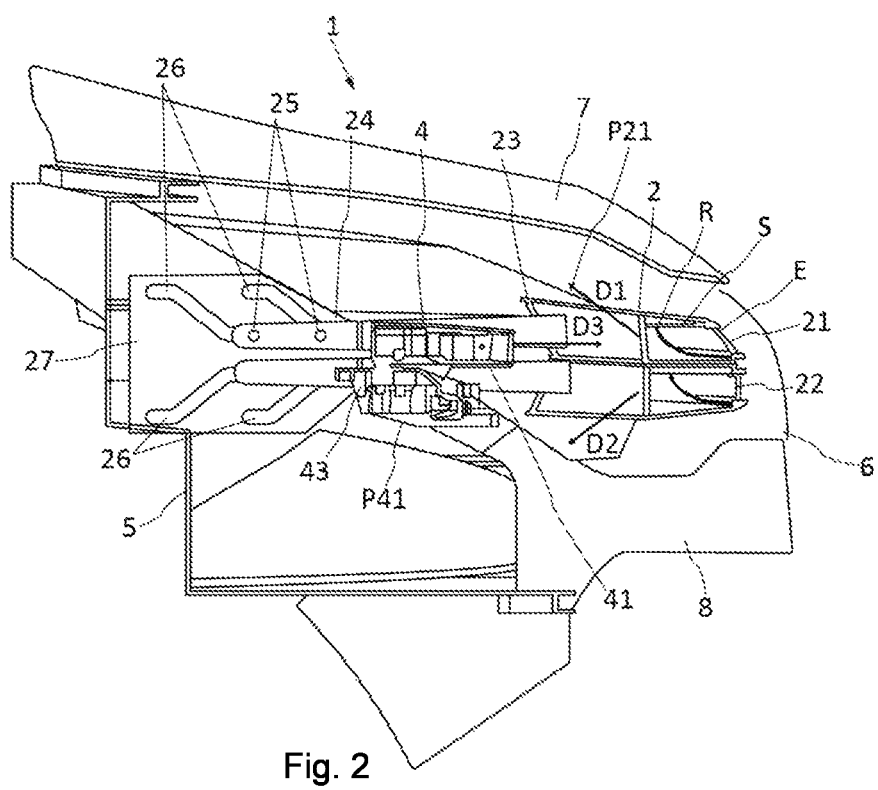
FIG. 2 shows a cross-sectional side view of the lighting device of FIG. 1.
Figure 3:
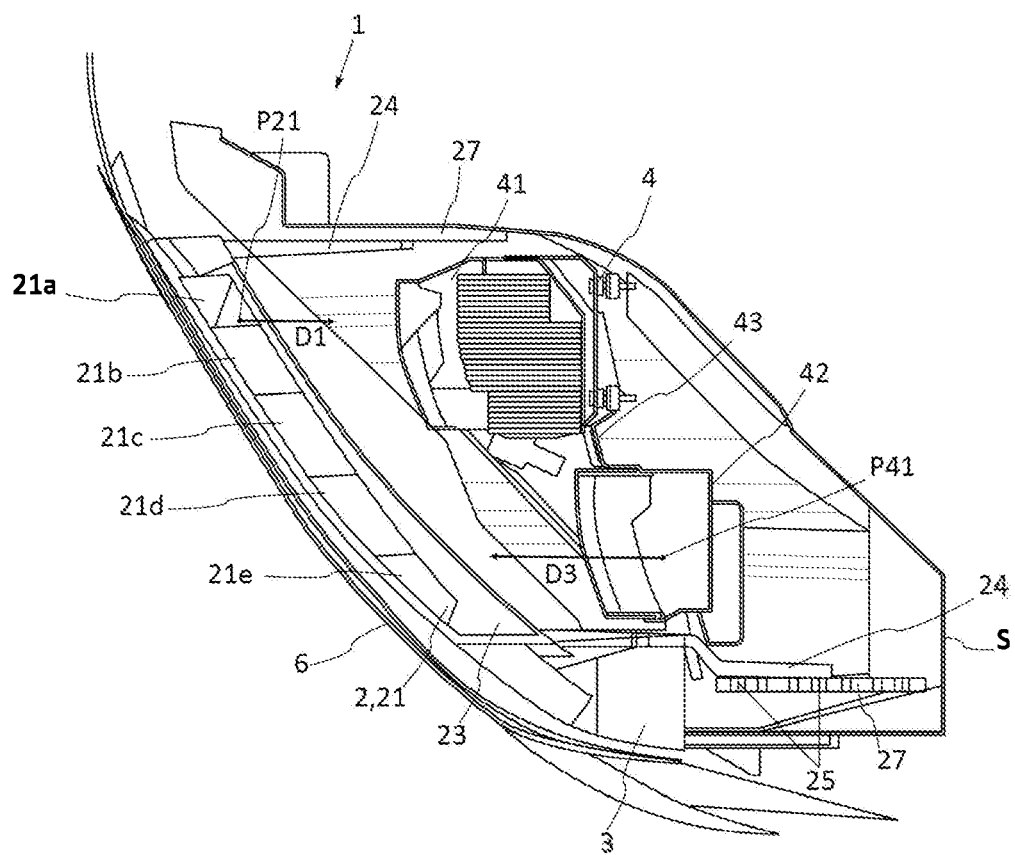
FIG. 3 shows a cross-sectional top view of the lighting device of FIG. 1.

In daytime mode, as shown in FIG. 1, FIG. 2 and FIG. 3, the upper and lower signaling sub-modules 21, 22 assume positions in which they are substantially contiguous, the moveable signaling module 2 thus assuming a position, called the closed position P21, in which it is visible from outside the lighting device 1 through the outer lens 6. The position P21 corresponds to an end-of-run position of the fingers 25 in the slideways 26, which position is said to be near with respect to the outer lens 6. Again in this daytime mode, the moveable lighting module 4 assumes a position P41 in which it is placed behind the moveable signaling module 2 in its closed position P21. In this position, which is called the invisible position P41, the lighting module 4 is completely masked by the moveable signaling module 2.

A controller (not shown) may thus control the moveable and fixed signaling modules 2, 3 so as to perform one of the following functions:

simultaneous emission by the light sources of the optical units 21a to 21e and by the light source of the fixed signaling module 3 of a light beam of white color, for example to perform a regulatory DRL function;

sequential emission by each of the light sources of the optical units 21a to 21e then by the light source of the fixed signaling module 3 of a light beam of yellow or amber color, for example to perform a regulatory sequential direction-indicator function;

sequential emission by each of the light sources of the optical units 21a to 21e then by the light source of the fixed signaling module 3 of a light beam of white color, for example to perform a welcome-lighting-scenario function.

During the performance of the aforementioned functions, the moveable lighting module 4 is turned off.

The controller is provided with an internal clock allowing it to determine the operating conditions of the lighting device 1 and in particular whether the lighting device 1 must operate in daytime or nighttime mode. Furthermore, the controller is arranged to control the actuators allowing the moveable signaling module 2 and moveable lighting module 4 to be moved.

Figure 4:
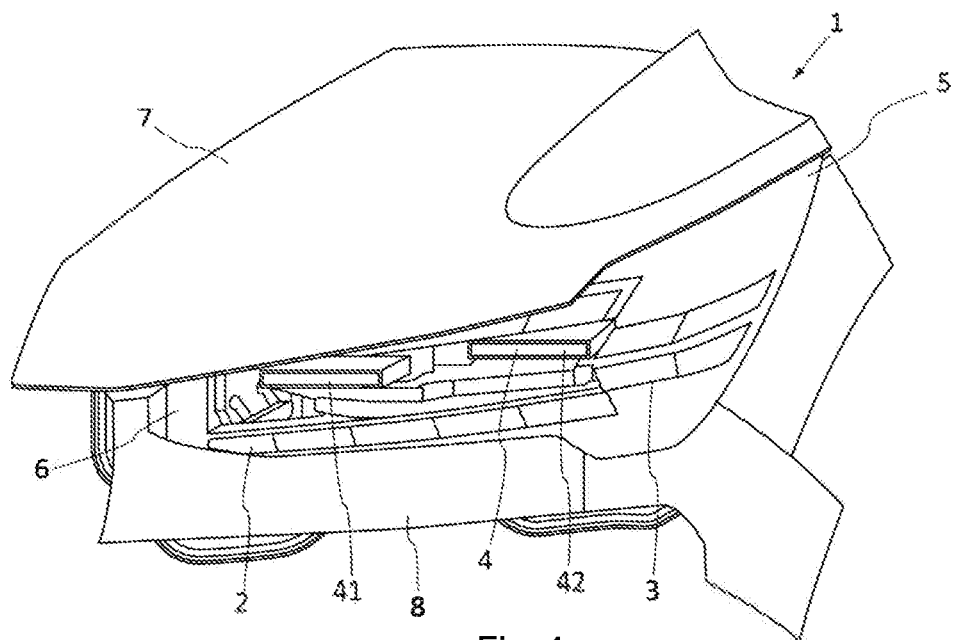
FIG. 4 shows a front view of the lighting device of FIG. 1 in nighttime mode.
Figure 5:
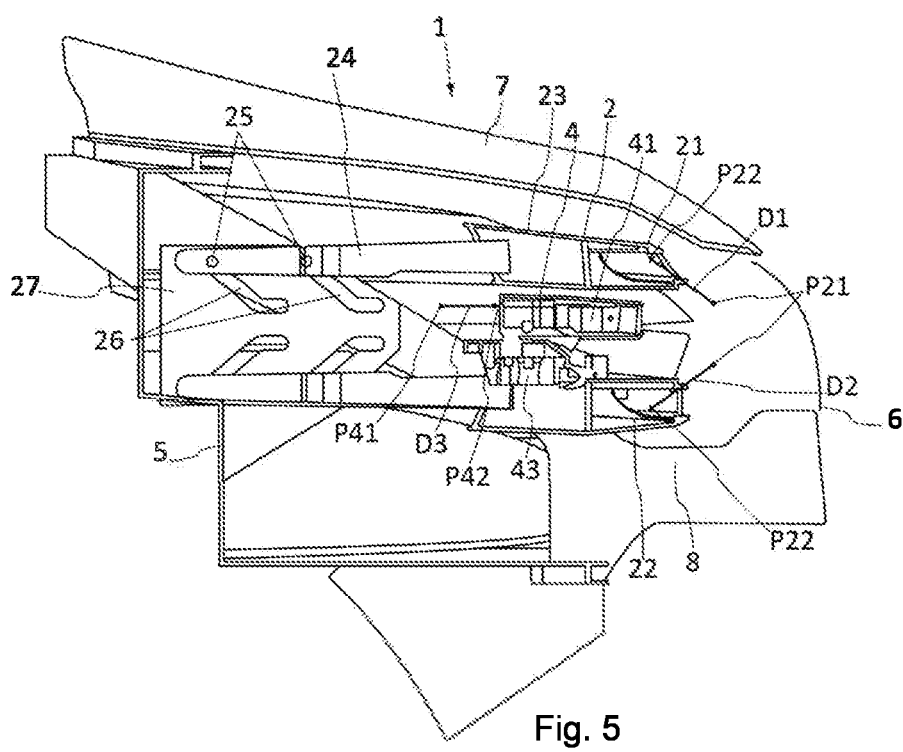
FIG. 5 shows a cross-sectional side view of the lighting device of FIG. 4.
Figure 6:
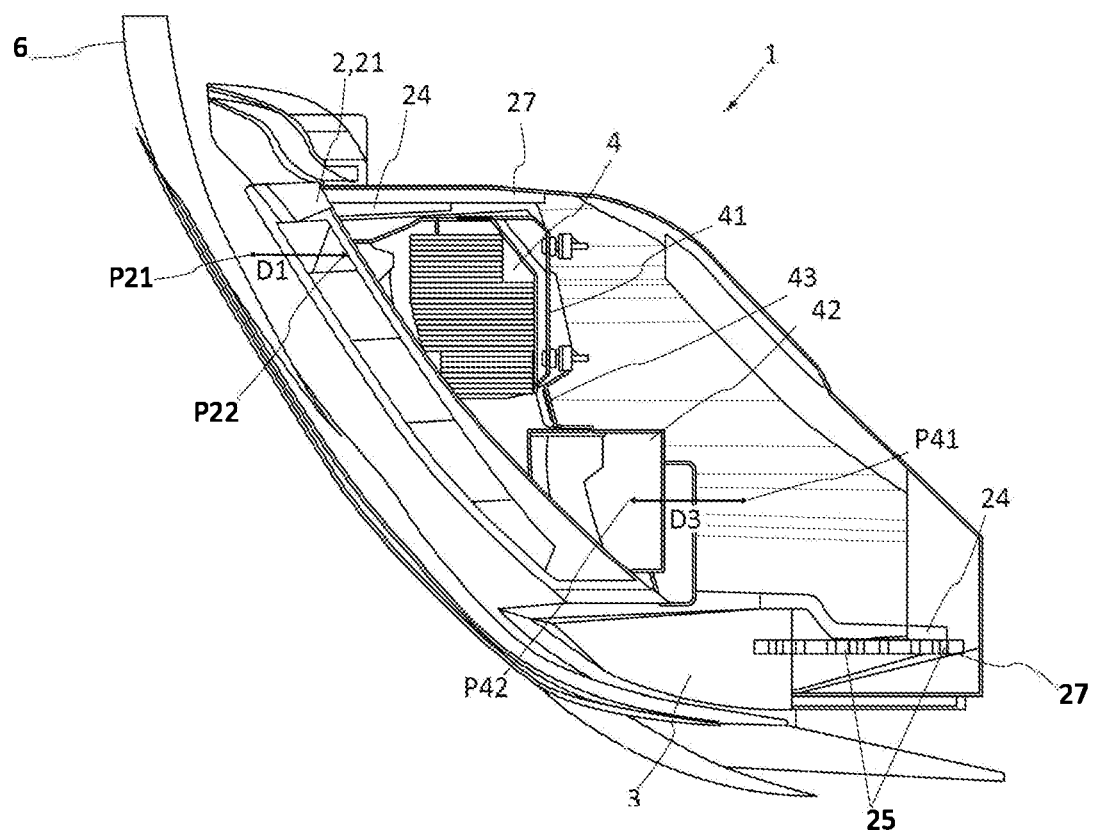
FIG. 6 shows a cross-sectional top view of the lighting device of FIG. 4.

The transition from the daytime mode to the nighttime mode of the lighting device 1, and the positions of the various modules 2, 3 and 4 and the various functions that these modules are able to perform in this nighttime mode will now be described. For this purpose, a front view has been shown in FIG. 4, a cross-sectional side view has been shown in [FIG. 5] and a cross-sectional top view has been shown in FIG. 6, of the lighting device 1 in nighttime mode.

During the transition from the daytime mode to the nighttime mode, the controller controls the actuators, driving a movement of the upper and lower signaling sub-modules 21, 22 so that these sub-modules 21, 22 move in the directions D1 and D2 to positions in which they are distant from each other. In nighttime mode, the moveable signaling module 2 thus assumes a position called the open position P22, the sub-modules 21, 22 being partially masked by the bodywork 7 and the bumper 8 and the moveable signaling module 2 thus being partially invisible from outside the lighting device 1. The position P22 corresponds to an end-of-run position of the fingers 25 in the slideways 26, which position is said to be far with respect to the outer lens 6.

Furthermore, during the transition from the daytime mode to the nighttime mode, the controller controls the actuator, driving a movement of the lighting module 4 so that the lighting module 5 moves in the direction D3, toward the space left free by the signaling sub-modules 21, 22. The actuators are controlled synchronously so that the movement of the signaling sub-modules 21, 22 in the directions D1 and D2 permits the movement of the lighting sub-modules 41, 42 in the direction D3. In other words, the space gradually left free by the signaling sub-modules 21, 22 allows the lighting module 4 to be accommodated during its own movement.

In nighttime mode, the moveable lighting module 2 thus assumes a position P42, called the visible position, in which it is said to be visible from outside the lighting device 1, and in which, on the one hand, it is no longer masked by the signaling sub-modules 21, 22, and, on the other hand, the space made available by the retraction of the signaling sub-modules 21, 22 creates an emission zone sufficient for a light beam to be able to be emitted by the lighting sub-modules 41, 42 without risk of an obstruction by these sub-modules 21, 22.

In nighttime mode, the controller may thus control the moveable lighting module 4 so as to perform one of the following functions:
   simultaneous emission by the light sources of the lighting sub-modules 41, 42 of a light beam of white color, for example to perform a regulatory low-beam or high-beam lighting function;
   emission by only certain of the light sources of the lighting sub-modules 41, 42 of a light beam of white color comprising a dark zone, for example to perform a glare-avoiding high-beam function.

Furthermore, during the performance of the aforementioned functions, the controller controls the turning on of the fixed signaling module 3 to perform a position-light function, the moveable signaling module 4 remaining turned off.

It may thus be seen that, whether under daytime or nighttime conditions, the turned-on appearance of the lighting device 1 remains broadly the same, this allowing a luminous signature that remains the same both day and night to be obtained.

The above description allowed how the transition from daytime mode to nighttime mode takes place to be explained. It goes without saying that the movements of the moveable signaling module 2 and moveable lighting module 4 could be reversed, so that, during the transition from the nighttime mode to the daytime mode, the moveable lighting module 4 returns to its invisible position P41 and the moveable signaling module 2 simultaneously returns to its closed position P21. In other words, the controller controls the movement of the moveable lighting module 4 so that this moveable lighting module 4 moves in the direction D3 in order to permit a movement of the moveable signaling module 2 in the directions D1 and D2 from its open position to its closed position.

The preceding description clearly explains how the invention allows the objectives that were set therefor to be achieved, and especially how it does so by providing a lighting device in which, during the transition from a daytime mode to a nighttime mode, the movement of a signaling module reveals a lighting module while permitting the movement of this lighting module. Hence, the retraction of the signaling module enlarges the emission zone available for the lighting module, so as to avoid obstruction of a light beam emitted by this lighting module.

In any event, the invention should not be regarded as being limited to the embodiments specifically described in this document, and in particular it extends to any equivalent means and any technically operative combination of these means. In particular, as regards the visible and invisible positions, provision will possibly be made for configurations of types other than the open/closed configuration, and for other modes of movement of the moveable lighting and signaling modules, and in particular to use a drive system, for example one based on a connecting rod, allowing these modules to be moved synchronously using a single actuator.

What is claimed is:

1. A motor-vehicle lighting device, comprising:
   a movable signaling module that is moveable in at least a first direction and a movable lighting module that is moveable in a direction that is different from the first direction;
   the moveable lighting module configured to assume a position in which the movable lighting module becomes invisible and is configured to assume a position where the movable lighting module becomes visible from outside the lighting device;
   the lighting device including
      a controller configured to control a movement of the movable lighting module so that the movable lighting module assumes an invisible position in a first mode and a visible position in a second mode;
   wherein the controller is configured to transition movement of the movable signaling module from the first mode to the second mode, such that a first signaling sub-module moves in the first direction and a second signaling sub-module moves in the second direction and the movable lighting module moves in a third direction that is different from the first and second directions in transitions from the first mode to the second mode.

2. The lighting device of claim 1, wherein the movable signaling module is configured to assume a position that is at least partially invisible from outside the lighting device and is configured to assume a position that is visible from outside the lighting device;
   the controller configured to control a movement of the movable signaling module so that the movable signaling module assumes a visible position in the first mode and a position that is at least partially invisible in the second mode.

3. The lighting device of claim 1, where the controller is configured to enable and disable both the movable signaling module and movable lighting modules, and where the controller enables the movable signaling module and disables the movable lighting module in the first mode and enables the movable lighting module and disables the movable signaling module in the second mode.

4. The lighting device of claim 1, further including a fixed signaling module.

5. The lighting device of claim 1, wherein the moveable signaling module includes a first signaling sub-module that is moveable in the first direction and a second signaling sub-module that is moveable in a third direction different from the first.

6. The lighting device as claimed in of claim 1, wherein the third direction is substantially symmetric to the first direction.

7. The lighting device of claim 6, wherein the moveable signaling module is able to assume a closed position in which the first and second signaling sub-modules assume positions in which they are substantially contiguous and an open position in which the first and second signaling sub-modules assume positions in which they are distant from each other, and wherein the controller is configured to control a movement of the movable signaling module so that the signaling module assumes the closed position in the first mode and the open position in the second mode.

8. The lighting device of claim 1, the lighting device comprising a first actuator for driving a movement of the moveable signaling module and a second actuator for driving a movement of the moveable lighting module, wherein the controller is configured to control the first and second actuators so that the movements of the moveable signaling and lighting modules in the first and second directions are synchronous.

9. The lighting device of claim 1, wherein the lighting device comprises a drive system that mechanically links the moveable signaling and lighting modules, the drive system being arranged so that a movement of one of the moveable signaling and lighting modules in the first direction drives a movement of the other of the modules of the moveable signaling and lighting modules in the first direction, and so that a movement of one of the moveable signaling and lighting modules in the second direction drives a movement of the other of the modules of the moveable signaling and lighting modules in the second direction.

10. The lighting device of claim 1, wherein the moveable signaling module or the moveable lighting module includes a plate that is mounted so as to be moveable translationally in a fixed slideway.

11. An automotive lighting device, comprising:

a movable signaling module configured to move in a first direction and a movable lighting module configured to move in a second direction that is different from the first direction;

the moveable lighting module configured to locate at a position where the movable lighting module becomes invisible from outside the automotive lighting device and the moveable lighting module configured to locate at a position where the movable lighting module becomes visible from outside the automotive lighting device;

where the automotive lighting device includes a controller configured to regulate movement of the movable lighting module such that the movable lighting module assumes an invisible position that is a first mode and assumes a visible position that is a second mode;

where the controller is configured to move the movable signaling module from the first mode to the second mode, such that a portion of the movable signaling module moves in the first direction and another portion of the movable signaling module moves in the second direction and the movable lighting module moves in a third direction that is different from the first direction and the second direction during a transition from the first mode to the second mode.

\* \* \* \* \*